United States Patent
Thompson et al.

[11] Patent Number: 6,063,219
[45] Date of Patent: May 16, 2000

[54] HIGHER DENSITY INHIBITED RED FUMING NITRIC ACID (IRFNA) OXIDIZER GEL

[75] Inventors: Darren M. Thompson, Madison; Barry D. Allan, Huntsville, both of Ala.

[73] Assignee: The United States of America as represented by the Secretary of the Army, Washington, D.C.

[21] Appl. No.: 09/306,030

[22] Filed: May 6, 1999

[51] Int. Cl.⁷ .............................. C06B 47/04; F02K 9/00; A62D 9/00; C04K 3/000; C01B 21/38
[52] U.S. Cl. .................. 149/74; 60/252; 252/186.44; 423/390.1
[58] Field of Search ................. 423/390.1, 393; 252/186.44; 149/74; 60/252

[56] References Cited

U.S. PATENT DOCUMENTS

| | | | |
|---|---|---|---|
| 3,116,187 | 12/1963 | Scanlon et al. | 149/74 |
| 5,133,183 | 7/1992 | Asaoka et al. | 60/204 |

*Primary Examiner*—Steven P. Griffin
*Assistant Examiner*—Maribel Medina
*Attorney, Agent, or Firm*—Arthur H. Tischer; Freddie M. Bush

[57] ABSTRACT

A high density inhibited red fuming nitric acid oxidizer gel is disclosed which results in an improvement from 0.5% to about 1.0.% in the impulse over a baseline formulation containing 14% nitrogen tetroxide. An improvement from about 3.0% to about 6.0% is achieved in the density impulse baseline formulation. The higher density inhibited red fuming nitric acid is derived by adding from about 15 percent by weight to about 45 percent by weight percent of nitrogen tetroxide to nitric acid in an amount from about 80 percent by weight to about 40 percent by weight. The other ingredient of the oxidizer gel comprise a gellant of about 0–10 percent by weight, water from about 0–4 percent by weight, and an inhibitor agent of about 0–1 percent by weight. IRFNA is inhibited with phosphoric acid, iodine compounds, or hydrogen fluoride which is present in the oxidizer gel as an additive. The higher density IRFNA oxidizer gel or liquid can be used in airbreathing propulsion systems; a bipropellant formulation is used to provide variable thrust. The oxidizer can also be used with air turbo rocket propulsion systems to augment air combustion with fuel gases. It can be used in a liquid or gel/solid system wherein the oxidizer is sprayed in contact with a solid propellant.

3 Claims, 3 Drawing Sheets

HIGHER DENSITY INHIBITED RED FUMING NITRIC ACID (IRFNA) OXIDIZER GEL

The invention described herein may be manufactured, used, and licensed by or for the Government for governmental purposes without the payment to us of any royalties thereon.

BACKGROUND OF THE INVENTION

Bipropellant gel propulsion systems spray oxidizer and fuel gel in contact with each other. These droplets then ignite hypergolically to produce the thrust for the gel propellant engine. These bipropellant gel systems have enough impulse for tactical applications but the density-impulse is lower than desired. The baseline fuel gel used by the Army is a 48% monomethylhydrazine, 1.5% hydroxypropyl cellulose and 50% carbon formulation. The oxidizer gel is inhibited red fuming nitric acid (IRFNA) type IIIB that is gelled with a 4.5% silicon dioxide. IR-FNA type IIIB is nitric acid that contains 14% nitrogen tetroxide. This combination of fuel and oxidizer has an optimum oxidizer to fuel ratio (O/F ratio) of 3.4.

Therefore, the largest improvement in density impulse occurs when modifications are made in the oxidizer gel.

SUMMARY OF THE INVENTION

By increasing the amount of nitrogen tetroxide from 14% to 28% in the IRFNA an appreciable increase in the density can be realized while the freezing point of the oxidizer gel can be maintained below −53° C. as can be seen in the phase diagram for the nitric acid/nitrogen tetroxide system (FIG. 1). The environmental requirement for most Army tactical systems is −65° F. (−53° C.). Increasing the nitrogen tetroxide ($N_2O_4$) concentration in the IRFNA from 14% to 28% will result in a 0.5% improvement in the impulse over the baseline formulation (FIG. 2) and a 3% improvement in the density impulse over the baseline formulation (FIG. 3) at an O/F ratio of 3.6.

Correspondingly, increasing the $N_2O_4$ in the IRFNA to 45% will result in a 1.0% improvement in impulse over the baseline formulation and a 6% improvement in the density impulse over the baseline formulation at an O/F ratio of 3.6.

DESCRIPTION OF THE PREFERRED EMBODIMENT

Figure 1:
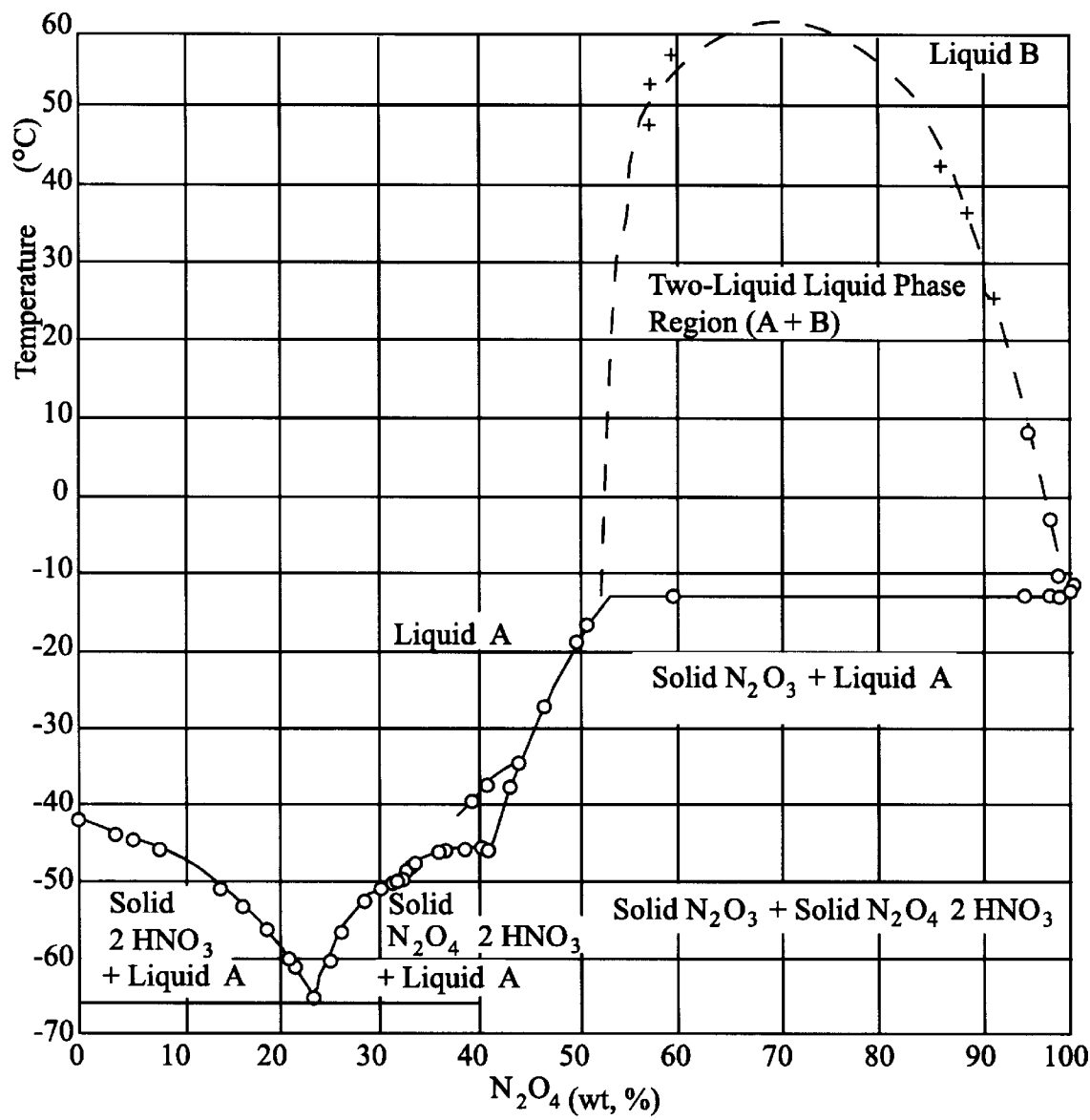
FIG. 1 is a phase diagram for nitric acid/nitrogen tetroxide solutions.

In further reference to the Drawing, FIG. 1, the phase diagram depicts various phases which can exist when nitrogen tetroxide is mixed with nitric acid. The baseline formulation of 14% nitrogen tetroxide and nitric acid is IRFNA IIIB. Therefore, the phase diagram is the best efforts approach of depicting the various phases at a particular percent nitrogen tetroxde added to nitric acid for various temperatures. This phase diagram depicts what is achieved when more than 14% is added to nitric acid from at certain temperatures. The identity of the components at different concentrations of added nitrogen tetroxide to nitric acid at various temperatures teaches the existence of solid nitric acid and liquid A which is considered to be nitrogen tetroxide and some reaction product of nitric acid and nitrogen tetroxide. The baseline IRFNA of 14% nitrogen tetroxide to 85% nitric acid depicts the intersection of the curve to be −50° C. By adding more nitrogen tetroxide e.g., 28% to nitric acid, the phase diagram depicts the intersection of the curve to be at about −56° C. Further addition of nitrogen tetroxide, e.g., 45% to nitric acid depicts the intersection of the curve to be at about −35° C. One recognizes that the higher nitrogen tetroxide content to nitric acid results in different equilibrium conditions and phases. However, in further reference to curves "b" of FIG. 2 and FIG. 3, it is readily discernable that both the impulse and density impulse are enhanced by the higher nitrogen tetroxide addition. The advantages derived from these unexpected benefits from applicants' invention are noted under Summary of The Invention above and as further discussed hereinbelow.

Figure 2:
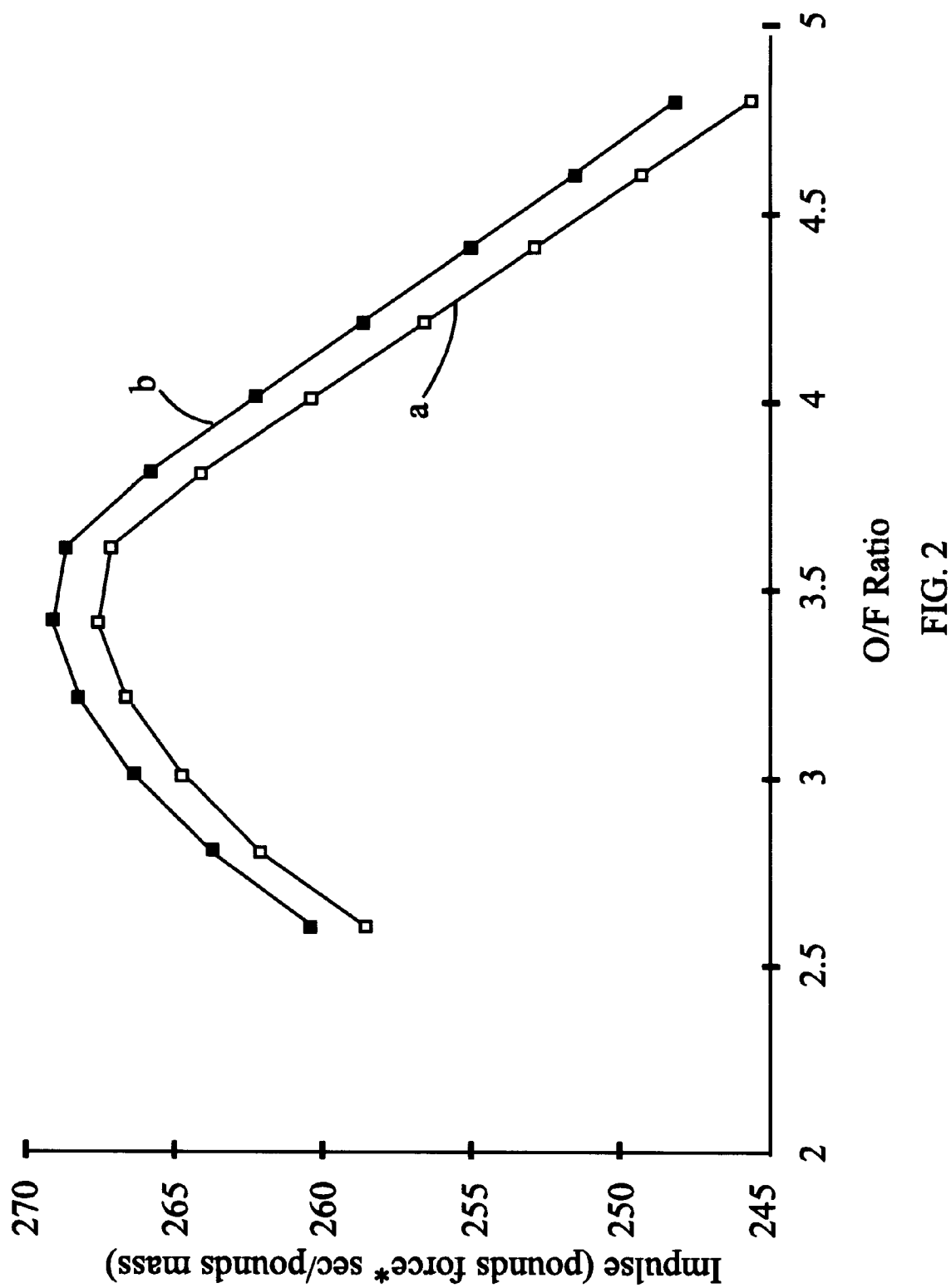
FIG. 2 is an IRFNA gel, impulse vs. O/F ratio.

In further reference to the Drawing, FIG. 2 depicts curve "a", the baseline concentration of 14% nitrogen tetroxide/ IRFNA gel. Curve "b" depicts the 28% nitrogen tetroxide/ IRFNA gel.

Each of the curves shows the elevations of impulse (pounds force* sec/pounds mass) to peak values at various O/F ratio. Curve "b" depicts a marked increase when compared to baseline curve "a" which is basic IRFNA.

Figure 3:
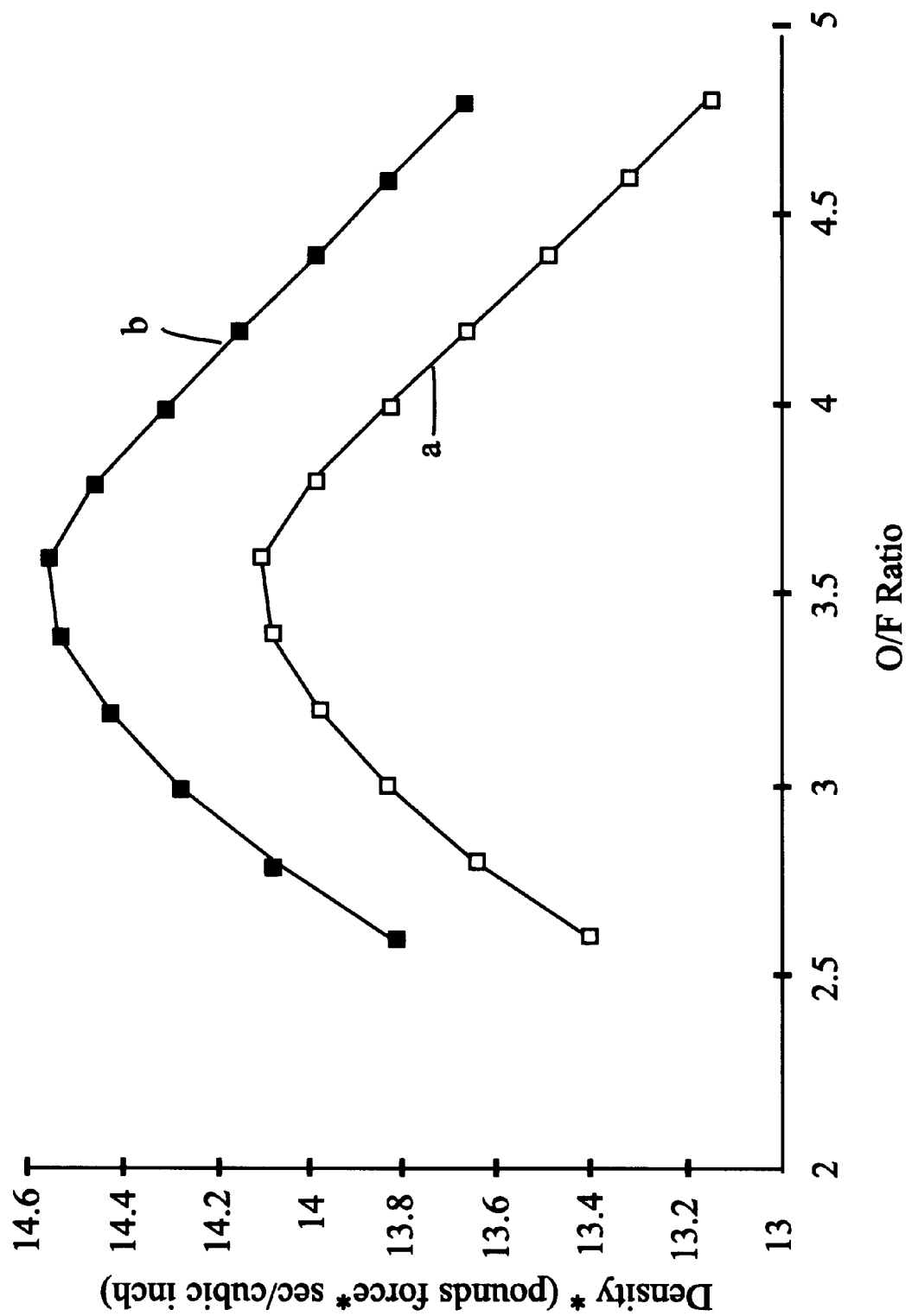
FIG. 3 is an IR-FNA gel, density impulse vs. O/F ratio.

In further reference to the Drawing, FIG. 3 depicts curve "a", the baseline concentration of 14% nitrogen tetroxide/ IRFNA gel. Curve "b" depicts the 28% nitrogen tetroxide/ IRFNA gel.

Each of the curves shows the variation of density *impulse (pounds force* sec/cubic inch) to peak values at various O/F ratio. /Curve "b" depicts a marked increase when compared to baseline curve "a" which is basic IRFNA.

The higher density IRFNA oxidizer gel can be used in airbreathing propulsion systems in which a bipropellant formulation is used to provide boost. The oxidizer gel can also be used with air turbo rocket propulsion systems to augment air combustion with fuel gases. It can be used in a gel/solid system wherein the oxidizer is sprayed in contact with a solid propellant. The examples cited wherein the higher density IRFNA oxidizer gel can be used are well known in the art.

The oxidizer gel has the following formulation:

0–10% gellant;
14%–45% nitrogen tetroxide;
80–40% nitric acid;
0–4% water;
0–1% inhibitors.

The gellant is typically silicon dioxide; however, other swellable polymeric gellants can be used or metallic oxide gellants can be used. Hydrogen fluoride is typically used as an inhibitor agent. Phosphoric acid or phosphorus pentoxide can be used in similar concentrations as an inhibitor agent. IRFNA is inhibited with phosphoric acid, iodine compounds, or hydrogen fluoride which is present in the oxidizer gel as an additive.

We claim:

1. A higher density inhibited red fuming nitric acid oxidizer gel comprising:
   (i.) a gellant from about 0 to about 10 percent by weight, said gellant selected from the group consisting of silicon dioxide, swellable polymeric gellants, and metallic oxide gellants;
   (ii) nitrogen tetroxide from about 14 to about 45 percent by weight;

(iii) nitric acid from about 80 to about 40 percent by weight;

(iv) water from about 0 to about 4 percent by weight; and, (v) an inhibitor agent from about 0 to about 1 weight percent, said inhibitor agent selected from the group consisting of hydrogen fluoride, phosphoric acid, and iodine compounds.

2. The higher density inhibited red fuming nitric acid oxidizer gel as defined in claim 1 wherein said nitrogen tetroxide is present in an amount of about 28 percent by weight and wherein said nitric acid is present in amount of about 57 percent by weight.

3. The higher density inhibited red fuming nitric acid oxidizer gel as defined in claim 1 wherein said nitrogen tetroxide is present in an amount of about 45 percent by weight and wherein said nitric acid is present in amount of about 40 percent by weight.

* * * * *